Aug. 25, 1970  J. S. LORD  3,525,925
TRIAC COMMUTATION CIRCUIT
Filed July 22, 1968
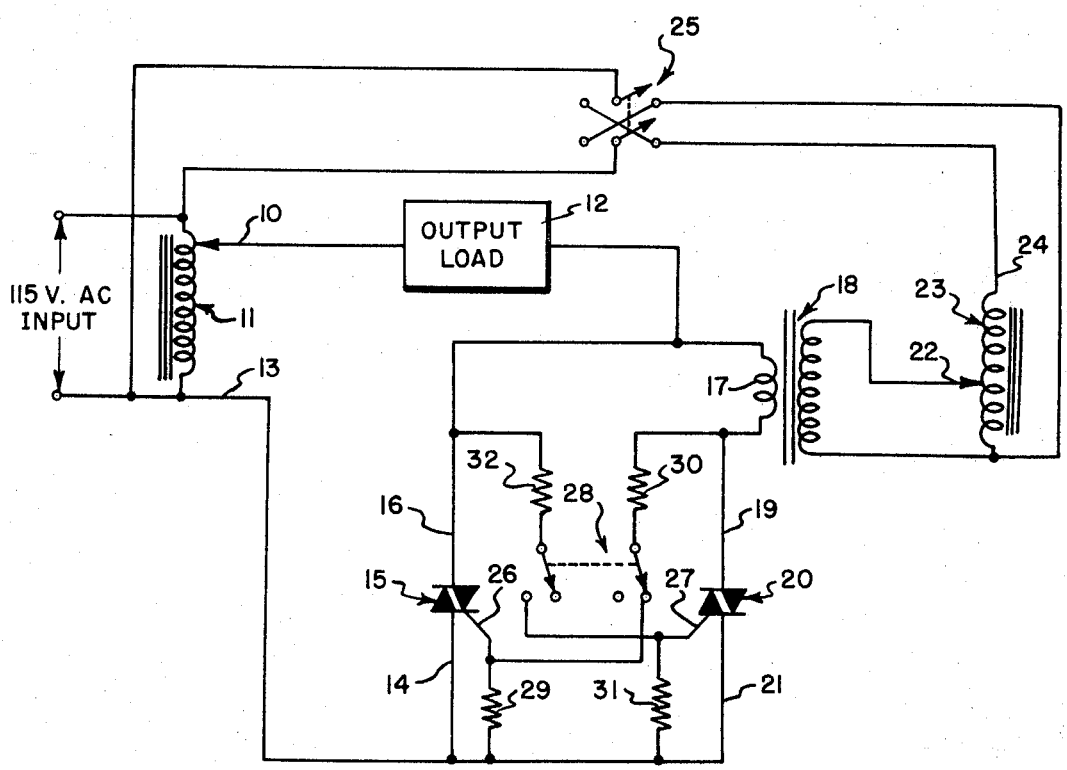
INVENTOR
Joseph S. Lord
BY Pennie, Edmonds,
Morton, Taylor & Adams
ATTORNEYS

United States Patent Office 3,525,925
Patented Aug. 25, 1970

3,525,925
TRIAC COMMUTATION CIRCUIT
Joseph S. Lord, Walpole, Mass., assignor to Kollmorgen Corporation, Garden City, N.Y., a corporation of New York
Filed July 22, 1968, Ser. No. 746,470
Int. Cl. G05f 1/30
U.S. Cl. 323—17                                3 Claims

ABSTRACT OF THE DISCLOSURE

A circuit for instantaneously changing the voltage level supplied to a load. When a first triac in series with a first voltage source is triggered into conduction it supplies a first voltage level to the load. Similarly, a second triac in series with a second voltage source supplies a second voltage level to the load when it conducts. A two-position switch is provided so that in one position the gate electrode of the first triac is connected to a voltage proportional to the voltage appearing across the second triac, and in a second position of the switch the gate electrode of the second triac is connected to a voltage proportional to the voltage across the first triac. This interconnection permits switching load current between the two triacs and ensures that one of the triacs is not turned on until the other triac has turned off.

BACKGROUND OF THE INVENTION

This invention relates to A-C power control circuitry and more particularly to a commutation circuit for triacs.

In the control of A-C power supplied to a load it is frequently necessary to switch instantaneously from one output voltage level to another without deenergizing the load. The use of mechanical switches and relays to accomplish this operation can produce high, unpredictable transients. Moreover, the life of such switches is shortened by interrupting high currents and voltages. This invention provides circuitry for instantaneously switching output voltage levels to a load by the use of solid state devices called triacs.

A triac is a bidirectional triode thyristor, i.e., a three-electrode A-C semiconductor switch which can be triggered into conduction by a gate signal in a manner similar to the action of a silicon controlled rectifier (SCR). Unlike the SCR, however, the triac can conduct in either direction of current flow in response to a positive or negative signal on its gate electrode. Because of these characteristics, triacs have found wide use in applications involving A-C power control, including light dimming, temperature regulation, solid state relays, solenoid valve operation and motor-speed control.

One problem encountered in the use of a triac is the difficulty in turning the device off, a process involved in "commutation." Because of the triac's bidirectional conduction it cannot be turned off like a conventional thyristor. For example, if the voltage across a conducting triac were reversed instantaneously the device would merely conduct in the opposite direction. To commutate or turn a triac off successfully, the current through it must be reduced below a minimum level (called the "holding current") by reducing the voltage applied across the triac substantially to zero. Sufficient time must then elapse to allow the recombination of stored charge in the triac before a voltage is applied across the triac. These commutation conditions are particularly troublesome when the triac is connected to an inductive load in which the current lags the voltage and reaches zero only after the voltage has attained a value in the opposite polarity. Thus when the current through the triac drops to zero, and the triac tries to turn off, the instantaneous line voltage appears suddenly across the triac at a rate limited only by stray circuit capacitance and the capacitance of the triac itself. If this voltage appears too rapidly, the triac immediately resumes conduction and does not commutate.

This invention provides circuit means for switching between two triacs, each triac controlling an associated voltage source for supplying a load. In switching from one triac to another it is important that one is not switched on while the other is conducting since in this event destruction of both triacs could result. The circuitry of the present invention ensures that each triac is properly commutated and that one of the triacs is not turned on until the other triac has been turned off.

SUMMARY OF THE INVENTION

This invention provides circuit means for instantaneously changing the level of an A-C voltage supplied to a load. A first triac is connected in series with a first voltage source adapted to supply a first voltage level to the load when the first triac is brought into conduction by a gating voltage on its gate electrode. A second triac is connected in series with a second voltage source adapted to supply a second voltage level to the load when the second triac is brought into conduction by the application of a gating voltage to its gate electrode. Two-position switching means are provided for connecting in a first position the gate electrode of the first triac to a voltage proportional to the voltage across the second triac, and in a second position the gate electrode of the second triac to a voltage proportional to the voltage across the first triac.

In a specific illustrated embodiment of the invention the first voltage source comprises a winding of a first transformer, and the second voltage source comprises the winding of a second transformer in series with the winding of the first transformer.

These and further objects and advantages of the present invention will become apparent when the following description is read in connection with the accompanying drawing.

BRIEF DESCRIPTION OF THE DRAWING

The drawing is a schematic diagram of a preferred embodiment of the triac commutation circuit provided by the invention.

DESCRIPTION OF THE ILLUSTRATED EMBODIMENT

Referring to the drawing, the output arm 10 of a variable voltage transformer 11 is connected to one side of load 12. The transformer 11, supplied from a line source of 115 volts A-C, is capable of supplying a variable A-C voltage from 0 to 115 volts at its output. The common terminal 13 of the transformer 11 is connected to terminal 14, one of the two current carrying terminals of a first triac 15. The *other* current carrying terminal 16 of the triac 15 is connected to the other side of the load 12, which is also tied through the secondary winding 17 of a step-down transformer 18 to a current carrying terminal 19 of a second triac 20. The other current carrying terminal 21 of the triac 20 is connected back to the common terminal 13 of the transformer 11.

The primary of the step-down transformer 18 is connected to the output 22 of a second variable voltage transformer 23. In turn, the input 24 of the transformer 23 is connected to the 115 volt A-C line through a DPDT polarity-reversing switch 25, wired as shown.

The gate electrodes 26 and 27 of the triacs 15 and 20 are connected to the terminals of a DPDT commutating switch 28 which in one position (that shown in the drawing) connects the gate electrode 26 of the first triac 15 to voltage divider resistors 29 and 30 across the terminals 19 and 21 of the second triac 20. In the other position of the commutating switch 28, the gate electrode 27 of the second triac 20 is connected through the voltage divider resistors 31 and 32 across the first triac 15. In a commutation circuit in which triacs 15 and 20 are SC40B type triacs suitable resistance values are 1000 ohms for resistors 29 and 31, and 200 ohms for resistors 30 and 32.

In the operation of the circuit, with commutating switch 28 in the position illustrated in the drawing, the first triac 15 is conducting so that an A-C voltage level approximately equal to the voltage at the output 10 of the variable transformer 11 is supplied to the load 12. With the switch 28 in this position, the first triac 15 remains gated "on" because its gate electrode 26 is connected to a portion of the voltage appearing across the non-conducting second triac 20. When the commutating switch 28 is thrown to its other position, the gate electrodes 26 of the first triac 15 is disconnected from its gating voltage and the gate electrode 27 of the second triac 20 is connected to a voltage corresponding to a portion of the voltage across the first triac 15. Since the voltage across a conducting triac is only about one volt, the voltage at the gate electrode 27 of the second triac 20 is too low to trigger it into conduction as long as the first triac 15 remains conducting. As the current through the first triac 15 passes through zero on the next cycle, this no-longer gated triac attempts to commutate and the voltage drop across it begins to rise. When the voltage across the first triac 15 has risen several volts the second triac 20 is gated on and the output load receives a voltage level equal to the voltage across the output 10 of transformer 11 plus or minus the voltage across the output 17 of the step-down transformer 18. The level and sign of this incremental voltage from the step-down transformer 18 are determined by the setting of the variable transformer 23 and the polarity reversing switch 25, respectively. Thus, by moving the commutating switch 28 to a new position the voltage across the load rises or falls within one-half cycle to a new level which is either the sum or difference of the output voltages of transformers 11 and 18. The actual switching of the load current between the first and second triacs occurs at a zero current cross-over for a load of any power factor. Moreover, the load regulation of the circuit, i.e., the variation of output voltage with changes in the load is excellent.

It will be understood that various changes in the details, materials, steps and arrangement of the parts which have been herein described and illustrated in order to explain the nature of the invention may be made by those skilled in the art within the principle and scope of the invention as expressed in the appended claims.

I claim:
1. A circuit for changing a voltage level supplied to a load comprising:
 (a) a first triac in series with a first voltage source adapted to supply a first voltage level to the load when the first triac is brought into conduction by a gating voltage applied to its gate electrode;
 (b) a second triac in series with a second voltage source adapted to supply a second voltage level to the load when the second triac is brought into conduction by a gating voltage applied to its gate electrode; and
 (c) two-position switching means for connecting in a first position the gate electrode of the first triac to a voltage proportional to the voltage across the second triac, and in a second position the gate electrode of the second triac to a voltage proportional to the voltage across the first triac.

2. A circuit according to claim 1 wherein the first voltage source comprises the winding of a first transformer, and the second voltage source comprises the winding of a second transformer in series with the winding of the first transformer.

3. A circuit according to claim 2 further comprising means for reversing the polarity of the voltage across the winding of the second transformer relative to the polarity of the voltage across the winding of the first transformer.

References Cited

UNITED STATES PATENTS 3,313,998   4/1967   Bunker.

OTHER REFERENCES

T. D. Koranye: "Closure of AC Line at Zero Voltage Using Triacs," IBM Technical Disclosure Bulletin, vol. 10, No. 7, December 1967, p. 894.

J D MILLER, Primary Examiner

A. D. PELLINEN, Assistant Examiner

U.S. Cl. X.R.

323—18, 24, 33, 39; 307—133